United States Patent
Jacobs et al.

(10) Patent No.: US 10,886,070 B2
(45) Date of Patent: Jan. 5, 2021

(54) POLYPROPYLENE FILM STRUCTURE

(71) Applicant: BOREALIS AG, Vienna (AT)

(72) Inventors: Franciscus Jacobs, Evergem (BE); Guido Boelaers, Overpelt (BE)

(73) Assignee: BOREALIS AG, Vienna (AT)

( * ) Notice: Subject to any disclaimer, the term of this patent is extended or adjusted under 35 U.S.C. 154(b) by 185 days.

(21) Appl. No.: 15/568,291

(22) PCT Filed: Apr. 26, 2016

(86) PCT No.: PCT/EP2016/059287
§ 371 (c)(1),
(2) Date: Oct. 20, 2017

(87) PCT Pub. No.: WO2016/174034
PCT Pub. Date: Nov. 3, 2016

(65) Prior Publication Data
US 2018/0108484 A1    Apr. 19, 2018

(30) Foreign Application Priority Data

Apr. 28, 2015 (EP) .................................... 15165299

(51) Int. Cl.
| | | |
|---|---|---|
| *H01G 4/32* | (2006.01) | |
| *H01B 3/22* | (2006.01) | |
| *H01B 3/44* | (2006.01) | |
| *H01G 4/18* | (2006.01) | |
| *H01G 4/22* | (2006.01) | |
| *C08J 5/18* | (2006.01) | |
| *B29K 23/00* | (2006.01) | |

(52) U.S. Cl.
CPC ................. *H01G 4/32* (2013.01); *C08J 5/18* (2013.01); *H01B 3/22* (2013.01); *H01B 3/441* (2013.01); *H01G 4/18* (2013.01); *H01G 4/22* (2013.01); *B29K 2023/14* (2013.01); *C08J 2323/12* (2013.01)

(58) Field of Classification Search
None
See application file for complete search history.

(56) References Cited

U.S. PATENT DOCUMENTS

| | | | |
|---|---|---|---|
| 4,534,953 A | 8/1985 | Nobuaki et al. | |
| 5,476,709 A * | 12/1995 | Inoue ...................... | C08L 23/10 428/216 |
| 6,077,907 A | 6/2000 | Raetzsch et al. | |
| 6,094,337 A * | 7/2000 | Ueda .......................... | C08J 5/18 361/311 |
| 2012/0010318 A1 * | 1/2012 | Tan ............................. | H01G 4/18 522/113 |
| 2013/0115471 A1 * | 5/2013 | Jacobs ...................... | H01G 4/18 428/461 |
| 2014/0110643 A1 * | 4/2014 | Kimura ................ | C10M 105/06 252/570 |
| 2015/0093627 A1 * | 4/2015 | Busch ............... | H01M 10/4235 429/145 |

FOREIGN PATENT DOCUMENTS

| | | |
|---|---|---|
| CN | 1198759 A | 11/1998 |
| CN | 102356439 A | 2/2012 |
| CN | 103448254 A | 12/2013 |
| CN | 104558297 A | 4/2015 |
| EP | 0099026 A1 | 1/1984 |
| EP | 0792894 A2 | 9/1997 |
| EP | 0885918 A1 | 12/1998 |
| EP | 2410539 A1 | 1/2012 |
| EP | 2543684 A1 | 1/2013 |
| JP | 2006-093688 A | 4/2006 |
| JP | 2008-127460 A | 6/2008 |
| WO | 2008/025796 A1 | 3/2008 |
| WO | 2015/091839 A1 | 6/2015 |

OTHER PUBLICATIONS

Office action for Japanese Patent Application No. 2017-554412, dated Jan. 8, 2019.
Busico, et al., "Full Assignment of the 13C NMR Spectra of Regioregular Polypropylenes: Methyl and Methylene Region", Macromolecules 1997, 30, 6251-6263.
Busico, et al., "Microstructure of polypropylene", Prog. Polym. Sci. 26 (2001)443-533.
Busico, et al., "Alk-1-ene Polymerization in the Presence of a Monocyclopentadienyl Zirconium(IV) Acetamidinate Catalyst: Microstructural and Mechanistic Insightsa", Macromol. Rapid Commun. 2007, 28, 1128-1134.
H.N. Cheng, "13C NMR Analysis of Ethylene-Propylene Rubbers", Macromolecules 1984, 17, 1950-1955.
Resconi, et al., "Selectivity in Propene Polymerization with Metallocene Catalysts", Chem. Rev. 2000, 100, 1253-1345.
Zhou, et al., "A new decoupling method for accurate quantification of polyethylene copolymer composition and triad sequence distribution with 13C NMR", Journal of Magnetic Resonance 187 (2007) 225-233.
Wang, et al., "Structural Analysis of Ethylene/Propylene Copolymers Synthesized with a Constrained Geometry Catalyst", Macromolecules 2000, 33, 1157-1162.
Extended European Search Report for Application No. > 15165299. 7-1308, dated Oct. 8, 2015.
Office action for Chinese Patent Application No. 201680023072.5, dated Oct. 12, 2018.

* cited by examiner

*Primary Examiner* — Chinessa T. Golden
(74) *Attorney, Agent, or Firm* — Tarolli, Sundheim, Covell & Tummino LLP

(57) ABSTRACT

The present invention is a structure comprising a biaxially oriented film having a layer comprising a homopolymer of propylene which layer is in contact with oil, characterised in that the homopolymer of propylene has a content of isotactic pentads of from 95% to 98% and a content of ash of not more than 30 ppm.

13 Claims, No Drawings

POLYPROPYLENE FILM STRUCTURE

FIELD OF THE INVENTION

The present invention is directed to structures comprising oil and biaxially oriented polypropylene films. Especially, the present invention is directed to a structure having flat winding of BOPP film and aluminium foil which combination is impregnated with oil. In particular, the present invention is directed to capacitors comprising such structures.

PROBLEM TO BE SOLVED

One method of producing capacitors is to wind a biaxially oriented PP (BOPP) film as with an aluminium foil. Currently, biaxially stretched polypropylene films, referred to simply as BOPP films hereinafter, are mainly used as the dielectric sheet material of power capacitors operated at a voltage of 600 V or higher by virtue of their excellent electric properties. A power capacitor of this type usually has a structure as a belt-bundled assembly of several to several tens of unit capacitor elements each in the form of a flattened rolled body prepared by enrolling a dual layer consisting of an OPP film and an aluminium foil. Such a belt-bundled assembly of unit capacitors is impregnated with oil in a metal casing before hermetic sealing EP-A-885918 discloses oil impregnated films of BOPP having isotactic pentad fraction of 99% or more and an ash content of 30 ppm or less.

The high isotactic fraction often lead to processability problems, for instance frequent film breaks during film orientation in machine direction but more specifically in cross direction in the tenter oven or too many bubble bursts in the double bubble film technology.

Further, the high content of isotactic material often has the consequence that the material is more prone to degradation during film processing. Unfortunately, many stabilisers and stabiliser combinations which have been found effective for normal BOPP films cause problems in oil impregnated films.

Secondary antioxidants, such as tris(2,4-ditert-butylphenyl)phosphite, increase the dissipation which is detrimental for the capacitor.

Further, certain primary antioxidants are migrated from the BOPP film into the oil thereby deteriorating the oil. This is the case especially if the oil contains aromatic hydrocarbons, such as benzyltoluene derivatives.

Therefore, the objective of the present invention was producing a biaxially oriented film which is in contact with oil and which is made of polypropylene having a combination high crystallinity and a good processability and which does not degrade during extrusion and film processing. Furthermore, the capacitors comprising such films and oil have a long operating life and the components of the film have a reduced tendency of migrating into the oil. Therefore, the films may be used in combination of a wide variety of oils. The films are especially useful in combination of oils containing aromatic hydrocarbons, especially cyclic aromatic hydrocarbons, such as derivatives of toluene.

SUMMARY OF THE INVENTION

As seen from one aspect, the present invention provides a structure comprising a film having a layer comprising of a homopolymer of propylene which layer is in contact with oil, characterised in that the homopolymer of propylene has a content of isotactic pentads of from 95% to 98% and a content of ash of not more than 30 ppm.

DETAILED DESCRIPTION

Homopolymer of Propylene

The homopolymer of propylene is produced by polymerising propylene in the presence of a polymerisation catalyst. The polymerisation catalyst typically comprises a solid component comprising a titanium halide, such as titanium trichloride, which in combination with an aluminium alkyl forms the catalyst. The homopolymer of propylene is thus produced by contacting propylene, the polymerisation catalyst and a chain transfer agent, such as hydrogen, optionally in an inert diluent, at a temperature of from 60 to 90° C. and a pressure of from 5 to 100 bar.

The homopolymer of propylene has a high crystallinity. Therefore it has a content of isotactic pentad fraction of from 95 to 98%, preferably from 95.5 to 98% and in particular from 96 to 97.5%. If the content of isotactic pentads is less than 95% then the final crystallinity of the film is rather low and the tensile properties and moduli of the film decrease, especially on BOPP films produced on double bubble technologies. On the other hand, if the content of isotactic pentads is more than 98% then there are frequent film breaks during film orientation in machine direction, on one hand, and more specifically in cross direction in the tenter oven, on the other hand, or too many bubble bursts in the double bubble film technology. The content of isotactic pentad fraction is typically determined by the polymerisation catalyst used for producing the propylene homopolymer. Suitable catalysts are, for instance, those disclosed in U.S. Pat. No. 4,534,953 and EP-A-99026. Furthermore, it is known to influence the fraction of isotactic material by using suitable donors, either internal or external electron donors. The internal donors are a part of the solid catalyst component. Examples of suitable internal donors include ethers, ketones, esters and their combinations. The external donors are typically contacted with the aluminium alkyl, the two of which combined form a cocatalyst. Suitable external donors include ethers, esters, silicon ethers, amines and their combinations.

Furthermore, the homopolymer of propylene has ash content of not more than 30 ppm, preferably not more than 20 ppm and in particular not more than 15 ppm. The low ash content is necessary because metallic impurities in the film may cause reduction in the breakdown voltage.

Typically, the low ash content may be obtained by using a catalyst which has a sufficiently high activity so that the catalyst residues remain at a low level. Alternatively, a catalyst with a small metal content may be used. Alternatively still, the polymer may be subjected to one or more washing steps where the catalyst residues are dissolved and removed from the polymer.

Suitable catalysts which can be used for producing the homopolymer of propylene include catalysts based on a solid component comprising titanium trichloride, optionally containing an ether or an ester as an internal donor; catalysts based on a solid component comprising titanium tetrachloride supported on magnesium dichloride containing an ether or an ester as an internal donor; catalysts based on a solid component comprising titanium tetrachloride which are prepared by solidifying an emulsion comprising droplets of titanium tetrachloride and magnesium dichloride and which solid component comprises an ether or an ester as an internal donor; and catalysts based on a solid component comprising titanium tetrachloride which are prepared by precipitating titanium tetrachloride and magnesium dichloride simultaneously from a solution and which solid component comprises an ether or an ester as an internal donor. Such solid components are used with an aluminium alkyl compound, such as triethylaluminium or diethylaluminiumchloride, or mixtures of aluminium alkyl compounds, optionally in combination with an external donor. It is especially preferred that the solid component comprises an electron donor. When using such catalysts the homopolymer of propylene has been found to be within the specified limits.

A process which is particularly effective in producing propylene homopolymers which are suitable for making the films for the present invention is disclosed in EP-A-2543684 where a catalyst based on a solid component comprising titanium trichloride was used in combination with an aluminium alkyl, organic ether and an alkyl methacrylate.

The polymerisation is conveniently conducted in slurry. In such a process the catalyst, hydrogen and propylene monomer are contacted in a diluent comprising essentially one or more alkanes having from 4 to 15 carbon atoms, preferably from 10 to 14 carbon atoms. By "comprising essentially" is hereby meant that the diluent comprises at least 90%, preferably at least 95% and more preferably at least 99% by weight of one or more of such alkanes.

The polymerisation is typically conducted at a temperature of from 50 to 100° C., preferably at 60 to 80° C. and a pressure of from 1 to 50 bar, preferably from 3 to 15 bar.

Preferably the process comprises one or more washing steps. Washing is typically conducted by contacting polymer slurry with a hydrocarbon diluent in one or more steps. Preferably the polymer slurry is contacted with the hydrocarbon diluent in at least two steps. When the washing includes multiple steps it is then preferred that in at least one step an alcohol or an ether is present in addition to the hydrocarbon diluent. This facilitates the removal of the catalyst components from the polymer and thereby a polymer with a very low ash content can be obtained.

Additives

The additives used in the present invention are preferably selected from the group consisting of nucleating agents, antioxidants, acid scavengers and stabilisers. In the subsequent text antioxidants and stabilisers may be commonly called as stabilisers.

The homopolymer of propylene according to the present invention has a higher isotacticity than the conventionally used homopolymers of propylene. Thus, it has been customary to use polypropylenes having an isotacticity of from 90 to 94% in the oil-impregnated films. However, it has been found that when homopolymers of propylene having an isotacticity of from 95 to 98% are used in the application of oil-impregnated films the polymer is more prone to degradation than the conventional homopolymer of propylene having an isotacticity of from 90 to 94%. Therefore, more effective stabilisation is required for the polymer.

Another problem is that some stabilisers tend to dissolve into the oil and thus migrate from the polymer into the oil. This deteriorates the oil, on one hand, and leaves the polymer without sufficient stabilisation, on the other hand. Thus, it is preferred to have a stabiliser or a combination of stabilisers which does not have the draw-backs discussed above and which does not adversely influence the electrical properties of the film.

The antioxidants and stabilisers used in the present invention are preferably selected from the group consisting of 1,3,5-trimethyl-2,4,6-tris(3,5-di-tert-butyl-4-hydroxybenzyl)benzene, butylhydroxytoluene and mixtures thereof.

1,3,5-Trimethyl-2,4,6-tris(3,5-di-tert-butyl-4-hydroxybenzyl)benzene is preferably present in an amount of from 500 to 2000 ppm, based on the weight of the homopolymer of propylene. More preferably, 1,3,5-trimethyl-2,4,6-tris(3,5-di-tert-butyl-4-hydroxybenzyl)benzene is present in an amount of 600 to 1700 ppm, and in particular from 600 to 1500 ppm, based on the weight of the homopolymer of propylene. 1,3,5-Trimethyl-2,4,6-tris(3,5-di-tert-butyl-4-hydroxybenzyl)benzene is available under trade names of Irganox 1330, Anox 330, Ethanox 330, and Kinox 30.

Butylhydroxytoluene (BHT) is preferably present in an amount of from 100 to 1000 ppm, based on the weight of the homopolymer of propylene. More preferably, butylhydroxytoluene (BHT) is present in an amount of from 200 to 900 ppm and in particular from 300 to 800 ppm, based on the weight of the homopolymer of propylene. Butylhydroxytoluene is available under trade names of Ionol CP and Vulkanox BHT.

It has been found that in the present BHT acts as a process stabiliser. It prevents the polymer from degrading during the extrusion. Thereby the MFR of the polymer measured from the film is not substantially greater than the MFR of the polymer measured from the pellets.

In particular, the antioxidants and stabilisers do not preferably contain phosphorous containing secondary antioxidants, such as tris(2,4-ditert-butylphenyl)phosphite, because such compounds increase the dissipation in the final capacitor.

Furthermore, the antioxidants and stabilisers do not preferably contain pentaerythritol tetrakis(3-(3,5-di-tert-butyl-4-hydroxyphenyl)propionate) as this compound tends to migrate from the film to the oil. This leads to deterioration of the oil.

Nucleating agents are typically selected from the group consisting of salts of monocarboxylic acids and polycarboxylic acids, such as sodium benzoate; sorbitol compounds, such as diacetals of sorbitol or xylitol; nonitol based nucleating agents; phosphorous-based compounds, such as mono-, bis- or tetra-phenyl phosphates; hindered phenyl amines, such as hindered phenyl propionamides; talc; polymeric nucleating agents, such as homopolymers of vinylcyclohexane and 4-methyl-1-butene; and mixtures of two or more of the abovementioned compounds.

Acid scavengers are typically salts of organic acids, such as stearates. They have the function of neutralizing acids in polymer. Examples of such compounds are calcium stearate, zinc stearate and zinc oxide.

Other Components

The film may contain other polymeric components preferably in an amount of not more than 10% by weight, more preferably not more than 5% by weight. Such other polymeric components may be further homo- or copolymers of propylene, homo- or copolymers of ethylene and the like. If additional polymeric components are present, they preferably are other homo- or copolymers of propylene, more preferably homopolymers of propylene. Such polymers may be, for instance, carrier polymers of additive masterbatches and the like.

Other suitable polymeric components are long-chain branched polypropylene, such as disclosed in EP-A-792894 and U.S. Pat. No. 6,077,907, polyvinylcyclohexane, poly-4-methyl-1-butene and the like. These polymers are typically present in an amount of not more than 5% by weight and more preferably in an amount of not more than 3% by weight.

BOPP Film

The biaxially oriented polypropylene film is produced from the homopolymer of propylene in any suitable method known in the art.

According to one suitable method the film is extruded through a flat die. The extrudate is cooled in a chill roll so that the film solidifies. Then the temperature is adjusted to 145-150° C. by passing the film over heated rollers. When the film has the desired temperature it is passed through one or more set of drawing rollers so that the stretch ratio at the end is from 4:1 to 6:1.

Thereafter the film is passed on to a series of annealing rollers where it is heated to such temperature that the film does not shrink in machine direction. The film is then passed to a chain containing clips which close on to the film. The film is heated to 160° C. after which the chain diverges to a ratio of 8:1 to 10:1 (final width: original width). Thereafter the film is annealed at 155° C. for reducing the shrinkage. Thereafter the edges are trimmed off and the film is slit and wound.

According to an alternative method the orientation line works by the so-called "double-bubble process", i.e. the polymers are extruded through a circular die and immediately quenched on an inner cooling mandrel thus forming a thick primary tube which is then re-heated up to a suitable temperature, such as 155 to 160° C., and blown to form the main bubble of thin film.

The non-contact simultaneous orientation is achieved due to inflation with air during the start-up phase. This air allows the transversal orientation while the machine direction orientation is taken simultaneously due to the speed difference between the stretching nip roll and the tower nip roll.

The bubble is cooled by air and then flattened; after the trimming of the edge, the two webs obtained are rolled up in two reels.

Capacitor

A of this type usually has a structure as a belt-bundled assembly of several to several tens of unit capacitor elements each in the form of a flattened rolled body prepared by enrolling a dual layer consisting of an OPP film and an aluminium foil. Such a belt-bundled assembly of unit capacitors is impregnated with oil in a metal casing before hermetically sealed.

Suitable oils used in the structure include mineral oils, synthetic hydrocarbon oils, vegetable oils and silicon oils.

One group of oils are those which contain aromatic hydrocarbons, preferably cyclic aromatic hydrocarbons, such as derivatives of toluene, in an amount of at least 20% by weight, preferably at least 50% by weight. Such oils are generally used in capacitors due to their outstanding thermal aging resistance. They are available, among other, under a trade name of Jarylec™ from Arkema.

The structures according to the present invention are suitable to be used in, for instance, high voltage power factor correction.

Benefits of the Invention

The capacitors including the structures according to the present invention have a good heat-resistance and they have good electrical properties. Especially, their dielectric properties are maintained for a long period of time. Further, the capacitors can be used up to the temperatures of about 105° C. Further, the components of the film do not migrate in any kind of oil, among others, they do not migrate in oils containing cyclic aromatic hydrocarbons in an amount of at least 20% by weight.

Description of Methods

Quantification of Microstructure by NMR Spectroscopy

Quantitative nuclear-magnetic resonance (NMR) spectroscopy was used to quantify the isotacticity and regio-regularity of the propylene homopolymers.

Quantitative $^{13}C\{^1H\}$ NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimised 10 mm extended temperature probehead at 125° C. using nitrogen gas for all pneumatics.

For propylene homopolymers approximately 200 mg of material was dissolved in 1,2-tetrachloroethane-d2 (TCE-d2). To ensure a homogenous solution, after initial sample preparation in a heat block, the NMR tube was further heated in a rotary oven for at least 1 hour. Upon insertion into the magnet the tube was spun at 10 Hz. This setup was chosen primarily for the high resolution needed for tacticity distribution quantification (Busico, V., Cipullo, R., Prog. Polym. Sci. 26 (2001) 443; Busico, V.; Cipullo, R., Monaco, G., Vacatello, M., Segre, A. L., Macromolecules 30 (1997) 6251). Standard single-pulse excitation was employed utilising the NOE and bi-level WALTZ16 decoupling scheme (Zhou, Z., Kuemmerle, R., Qiu, X., Redwine, D., Cong, R., Taha, A., Baugh, D. Winniford, 15 B., J. Mag. Reson. 187 (2007) 225; Busico, V., Carbonniere, P., Cipullo, R., Pellecchia, R., Severn, J., Talarico, G., Macromol. Rapid Commun. 2007, 28, 11289). A total of 8192 (8 k) transients were acquired per spectra.

Quantitative $^{13}C\{^1H\}$ NMR spectra were processed, integrated and relevant quantitative properties determined from the integrals using proprietary computer programs.

For propylene homopolymers all chemical shifts are internally referenced to the methyl isotactic pentad (mmmm) at 21.85 ppm.

Characteristic signals corresponding to regio defects (Resconi, L., Cavallo, L., Fait, A., Piemontesi, F., Chem. Rev. 2000, 100, 1253; Wang, W-J., Zhu, S., Macromolecules 33 (2000), 1157; Cheng, H. N., Macromolecules 17 (1984), 1950) or comonomer were observed.

The tacticity distribution was quantified through integration of the methyl region between 23.6-19.7 ppm correcting for any sites not related to the stereo sequences of interest (Busico, V., Cipullo, R., Prog. Polym. Sci. 26 (2001) 443; Busico, V., Cipullo, R., Monaco, G., Vacatello, M., Segre, A. L., Macromolecules 30 (1997) 6251).

By pentad isotacticity is meant the fraction of isotactic pentads (mmmm).

Rheology:

Dynamic rheological measurements were carried out with Rheometrics RDA-II QC on compression moulded samples under nitrogen atmosphere at 230° C. using 25 mm diameter plate and plate geometry. The oscillatory shear experiments were done within the linear viscoelastic range of strain at frequencies from 0.015 to 300 rad/s (ISO 6721-10).

The values of storage modulus (G'), loss modulus (G"), complex modulus (G*) and complex viscosity (η*) were obtained as a function of frequency (ω).

The Zero shear viscosity ($\eta_0$) was calculated using complex fluidity defined as the reciprocal of complex viscosity. Its real and imaginary part are thus defined by $$f'(\omega)=\eta'(\omega)/[\eta'(\omega)^2+\eta''(\omega)^2] \text{ and}$$

$$f''(\omega)=\eta''(\omega))/[\eta'(\omega)^2+\eta''(\omega)^2]$$

From the following equations $$\eta'=G''/\omega \text{ and } \eta''=G'/\omega$$

$$f'(\omega)=G''(\omega)\cdot\omega/[G'(\omega)^2+G''(\omega)^2]$$

$$f''(\omega)=G'(\omega)\cdot\omega/[G'(\omega)^2+G''(\omega)^2]$$

The complex viscosity ratio eta*(0.05rad/sec)/eta*(300rad/sec), also the shear thinning index is the ratio of the complex viscosity ($\eta^*$) at 0.05 rad/sec to the complex viscosity ($\eta^*$) at 300 rad/sec.

The polydispersity index, PI, PI=$10^5/G_c$, is calculated from the cross-over point of G'($\omega$) and G''($\omega$), for which G'($\omega_c$)=G''($\omega_c$)=$G_c$ holds.

Melt Flow Rate

Melt flow rate (MFR, $MFR_2$) was determined according to ISO 1133 at 230° C. under the load of 2.16 kg.

Melting Temperature and Crystallinity of the Film

Melting temperature was measured on about 5 to 7 mg film samples with a TA Instrument Q200 differential scanning calorimetry (DSC). DSC is run according to ISO 11357/part 3/method C2 in a heat/cool/heat cycle with a scan rate of 10° C./min in the temperature range of −30 to +225° C. The crystallinity is obtained by dividing the measured melting enthalpy (in J/g) by the melting enthalpy of 100% crystalline polypropylene, 209 J/g.

Yellowness Index

Yellowness index was determined according to ASTM E-313.

Ash Content

The ash content of the polymer was determined by combusting the polymer in a weighed platinum crucible. About 100 grams of polymer is weighed into the crucible. The crucible is then heated in a Bunsen burner flame so that the polymer slowly burns. After the polymer is completely burned the crucible is cooled, dried and weighed. The ash content is then the weight of the residue divided by the weight of the polymer sample. At least two measurements are made and if the difference between the measurements is more than 7 ppm then a third measurement is made.

EXAMPLES

Example 1

The polymerisation process according to Inventive Example 1 of EP-A-2543684 was used for the polymerisation of propylene. Hydrogen and propylene were fed into the reactor so that in each of the polymerisation reactors a propylene homopolymer having $MFR_2$ of about 3.4 g/10 min was produced. Into the polymer was added Irganox 1330 in an amount of 1000 ppm and BHT in an amount of 750 ppm. The propylene homopolymer had a polydispersity index of 5.5 $Pa^{-1}$, a shear thinning index of 14, ash content of 8 ppm and a pentad isotacticity of 96.2%.

The propylene homopolymer as described above was extruded to a film and subsequently stepwise biaxially oriented, the resulting film having a thickness of 11 µm. The film had a melting temperature of 167° C. and crystallinity of 44.6%.

Example 2

The procedure of Example 1 was otherwise followed except that instead of Irganox 1330, Irganox 1010 was used and BHT was not used. The propylene homopolymer had a polydispersity index of 5.5 $Pa^{-1}$, a shear thinning index of 14, ash content of 8 ppm and a pentad isotacticity of 96.2%.

Comparative Example 1

The procedure of Example 1 was otherwise followed except that the polymerisation process was conducted according to Comparative Example 1 of EP-A-2543684 and that instead of Irganox 1330, Irganox 1010 was used and BHT was not used. The propylene homopolymer had a polydispersity index of 4.5 $Pa^{-1}$, a shear thinning index of 10, ash content of 9 ppm and a pentad isotacticity of 92.2%.

The propylene homopolymer as described above was extruded to a film and subsequently stepwise biaxially oriented, the resulting film having a thickness of 11 µm. The film had a melting temperature of 166° C. and crystallinity of 42.6%.

As can be seen from the Example 1 and Comparative Example 1 the film of Example 1 has greater crystallinity and melting temperature than the film of Comparative Example 1.

The stability of polymers of Example 1 and Comparative Example 1 was evaluated by subjecting the polymers to multiple extrusion tests. The yellowness index of the polymer was measured.

TABLE 1

Yellowness index of the polymers of Examples 1 and 2 and Comparative Example 1 after multiple extrusions.

| Number of extrusions | E1 | E2 | CE1 |
|---|---|---|---|
| 1 | 0.8 | 2.5 | 1.2 |
| 2 | 2.3 | 5.2 | 2.8 |
| 3 | 3.0 | 6.6 | 3.3 |
| 4 | 4.1 | 8.3 | 4.8 |
| 5 | 4.8 | 9.0 | 4.8 |

The data indicates that the polymers of Example 1 and Comparative Example 1 have equal resistance against degradation.

Example 3

A sample of the film of Example 1 was immersed in Jarylec C101 oil at 80° C. for a period of 100 days. When the oil was analysed no sign of Irganox 1330 or BHT was found.

Comparative Example 2

The procedure of Example 3 was repeated with the film of Comparative Example 1. When the oil was analysed it was found to contain Irganox 1010 which had migrated into oil from the film.

Example 4

To further illustrate the effect of stabilisation the polymer powder produced according to the process of Example 1 but having $MFR_2$ adjusted to 2.8 g/10 min was mixed with Irganox 1330 in an amount of 1000 ppm and BHT in an amount of 750 ppm. The polymer was extruded into pellets. The $MFR_2$ of the pellets was measured and found to be 3.3 g/10 min.

Another batch of the same polymer was mixed only with 1000 ppm of Irganox 1330. The $MFR_2$ of the pellets was measured and found to be 4.8 g/10 min.

The invention claimed is:

1. A structure comprising a biaxially oriented film having a layer comprising:
   a homopolymer of propylene which layer is in contact with oil, characterised in that the homopolymer of propylene has a content of isotactic pentads of from 95% to 98% and a content of ash of not more than 30 ppm; and
   stabilisers, wherein the stabilisers are selected from the group consisting of 1,3,5-Trimethyl-2,4,6-tris(3,5-di-tert-butyl-4-hydroxybenzypenzene in an amount of from 600 to 1700 ppm, butylhydroxytoluene in an amount of from 200 to 900 ppm, both based on the amount of the homopolymer of propylene, and the mixtures thereof; and
   wherein the biaxially oriented film does not contain pentaerythritol tetrakis(3-(3,5-di-tert-butyl-4-hydroxyphenyl)propionate).

2. The structure according to claim 1 wherein the biaxially oriented film has a total content of additives selected from the group consisting of stabilisers, acid scavengers and nucleating agents in the range of from 600 to 5000 ppm.

3. The structure according to claim 2, wherein the oil comprises at least 20% by weight of aromatic hydrocarbons.

4. The structure according to claim 3 wherein the oil comprises cyclic aromatic hydrocarbons.

5. The structure according to claim 4 wherein the oil comprises at least 50% by weight of cyclic aromatic hydrocarbons.

6. The structure according to claim 4, wherein the cyclic aromatic hydrocarbons are toluene derivatives.

7. A method for making a capacitor comprising: providing a biaxially oriented film that includes a homopolymer of propylene having a content of isotactic pentads of from 95% to 98% and a content of ash of not more than 30 ppm; and stabilizers, wherein the stabilizers are selected from the group consisting of 1,3,5-Trimethyl-2,4,6-tris(3,5-di-tert-butyl-4-hydroxybenzypenzene in an amount of from 600 to 1700 ppm, butylhydroxytoluene in an amount of from 200 to 900 ppm, both based on the amount of the homopolymer of propylene, and the mixtures thereof; and wherein the biaxially oriented film does not contain pentaerythritol tetrakis(3-(3,5-di-tert-butyl-4-hydroxyphenyl)propionate); and
   contacting a layer of the film with oil.

8. The method of claim 7, comprising the steps of flat winding the film and an aluminum foil to obtain a wound structure, and impregnating the wound structure with oil.

9. The method claim 7, wherein the film has a total content of additives selected from the group consisting of stabilisers, acid scavengers and nucleating agents in the range of from 600 to 5000 ppm.

10. The method of claim 9, wherein the oil comprises at least 20% by weight aromatic hydrocarbons.

11. The method of claim 10, wherein the oil comprises cyclic aromatic hydrocarbons.

12. The method of claim 1, wherein the oil comprises at least 50% by weight of cyclic aromatic hydrocarbons.

13. The method of claim 11, wherein the cyclic aromatic hydrocarbons are toluene derivatives.

* * * * *